United States Patent [19]

Sundberg

[11] Patent Number: 4,546,053
[45] Date of Patent: Oct. 8, 1985

[54] SEALED LEAD-ACID STORAGE CELLS

[76] Inventor: Erik G. Sundberg, 447 Union St., Newtown Crossing, Pa. 18940

[21] Appl. No.: 692,669

[22] Filed: Jan. 17, 1985

[30] Foreign Application Priority Data

May 7, 1984 [SE] Sweden .................................. 8402437

[51] Int. Cl.$^4$ ..................... H01M 10/12; H01M 4/14
[52] U.S. Cl. ................................... 429/57; 429/129;
429/140; 429/209; 429/225
[58] Field of Search .............. 429/129, 132, 140, 209,
429/57, 225-227, 233, 238, 246, 190

[56] References Cited

U.S. PATENT DOCUMENTS

| | | | |
|---|---|---|---|
| 1,663,741 | 3/1928 | Vaughan-Sherrin | 429/238 |
| 2,997,516 | 8/1961 | Soding | 429/209 |
| 3,057,943 | 10/1962 | Strauss | 429/60 |
| 3,257,237 | 6/1966 | Jache | 429/225 |
| 3,457,112 | 7/1969 | Reber | 429/225 |
| 3,852,111 | 12/1974 | Brinkmann et al. | 429/225 |
| 3,897,266 | 7/1975 | Devitt et al. | 429/57 |

Primary Examiner—Anthony Skapars
Attorney, Agent, or Firm—Hamilton, Brook, Smith & Reynolds

[57] ABSTRACT

Sealed lead-acid storage cells are described, characterized by positive electrode means comprising one or more positive electrode assemblies. Each electrode assembly in turn comprises two positive electrode members lying in spaced apart relationship to one another and having an electrolyte reservoir located therebetween. In this manner it may be insured that sufficient electrolyte is present in the cells to more fully utilize the active material of the positive and negative electrodes, while still allowing the separators lying between the positive and negative electrodes to be as thin as possible and to be less than fully saturated with electrolyte. This less than fully saturated condition provides paths for oxygen transport between the positive and negative electrodes, thus facilitating recombination of oxygen, which may be evolved at the positive electrodes during charging, at the negative electrodes.

18 Claims, 13 Drawing Figures

SEALED LEAD-ACID STORAGE CELLS

BACKGROUND OF THE INVENTION

Sealed lead-acid storage cells, in which the electrolyte is completely absorbed within the pores of the positive and negative electrodes and within foraminous separator structures lying between the positive and negative electrodes, are known to the battery art. Such constructions are described, for example, in U.S. Pat. No. 3,862,861 (McClelland et al) and in U.S. Pat. No. 4,421,832 (Uba). It is a characteristic of these cells that there is not sufficient electrolyte present to fully utilize the active material of the positive and negative electrodes and, for this reason, such devices are termed "Starved Electrolyte" cells. It has been found that such cells may be operated over long periods of time without a significant loss of the water component of the electrolyte, and thus may be operated as completely sealed units. Such devices may also be termed "Oxygen Recombining" cells.

It is well known to the art that, in order to store a specific amount of electrical energy in a lead-acid storage cell, specific quantities of each of three types of materials will be required. These materials are Positive Active Material, Negative Active Material, and Electrolyte. The relationships and interactions between these three types of materials have been fully discussed in standard texts; one such reference is "Storage Batteries" by George Vinal (see 2nd Ed., Ch. 4).

In practice it is not possible to fully utilize the positive and negative active materials in a lead-acid cell. Active material utilization is dependent upon the rate of discharge. At low discharge rates (such as those lasting ten hours or more) active material utilization may be several times as great as that experienced at higher discharge rates (such as an engine "cranking" rate, which may last for as little as five to ten seconds). Thus cells designed for low discharge rates require substantially more electrolyte than do cells designed for high discharge rates. Cells built according to the teachings of McClelland et al may be suitable for high discharge rates, but are less than satisfactory when used at low discharge because of their lack of sufficient electrolyte.

In general, for a good low rate capability, the volume of electrolyte needed to fully utilize one "volume unit" of positive electrode (grid plus active material) will be approximately three "volume units," including the electrolyte required by the associated negative electrode or electrodes, and including the electrolyte contained in a suitable separator material. Thus, if the electrolyte were considered to be present in "layers," one on each side of the positive electrode and having the same height and width as the positive electrode, the combined thickness of the electrolyte "layer" would be three times as great as the thickness of the positive electrode. It is pointed out that this relationship will be dependent upon the specific gravity of the electrolyte; the above figures assume a standard specific gravity of 1.275. In "open" cells, wherein the electrolyte is not intended to be totally absorbed by the electrodes and separators, it is common to store considerable amount of "free" electrolyte in a space above the electrodes and separators; this approach cannot be tolerated in a sealed cell because oxygen transport between the positive and negative electrodes will be severely inhibited by the free electrolyte.

One of the most important factors governing the usable life of a lead-acid cell is the cross-sectional area of the bars of the grid structure of the positive electrode. Thicker bars (and thus thicker electrodes) usually result in longer-lived electrodes. Thus cells designed for low discharge rate applications commonly include positive electrodes ranging from approximately 4 mm to approximately 10 mm in thickness. In cells designed according to the teachings of McClelland et al, wherein all electrolyte is to be absorbed in the separators and electrodes, and using the three-to-one thickness ratio above, it will be seen that the total thickness of the electrolyte layers should range between 6 mm and 15 mm on each side of the positive electrode.

However, there are important reasons to keep the electrolyte layers as thin as possible. First, the electrical resistance of the electrolyte layers will be relatively high in comparison to that of the electrodes. This resistance is directly related to the thickness of the electrolyte layer. During discharge this resistance will consume electrical energy and will result in a lowered voltage at the cell terminals. This loss of power will be most noticeable at high rates of discharge, as can be seen from a consideration of Ohm's Law. The above consideration is an important factor in the design of any storage cell.

A second reason to keep the electrolyte layer as thin as possible is of particular importance in so-called "oxygen recombining" cells. In such cells the rate of oxygen recombination is inversely related to the distance between the positive and negative electrodes. Oxygen gas, which may be evolved at the positive electrodes when the cell approaches a fully-charged state, is transported to the negative electrodes where it is recombined with hydrogen and returned to the electrolyte as water. Oxygen will continue to be evolved and, likewise, will continue to be recombined as the charging process continues. It is this feature that enables an "Oxygen Recombining" cell to operate over its lifetime without an appreciable loss of water.

The aforementioned "rate of oxygen recombination" determines the amount of electrical current which an oxygen recombining cell will accept on a continuous basis after the cell has reached a fully-charged state, without a loss of water. It is desirable to design the cell such that this rate is as high as possible and, therefore, the positive and negative electrodes should be as close together as possible in order to provide a very thin electrolyte layer. In practice it has been found that the thickness of the electrolyte layer should be in a range between 1/10 mm to 3 mm. Above 3 mm the rate of oxygen recombination may be prohibitively low.

Two mechanisms for the transport of oxygen from the positive electrodes to the negative electrodes have been observed. In the first mechanism, oxygen evolved at the positive electrodes becomes dissolved in the electrolyte and is carried to the negative electrodes by the natural convective currents which occur within the cell. In the second mechanism, oxygen evolved at the positive electrodes flows directly to the negative electrodes in the gaseous phase, without the intermediate "solution" phase. In this case it is necessary to provide gas passages of some sort in order to permit the gas to flow. This may be done by only partially filling the cell with electrolyte, such that the electrolyte layer does not extend upward to the tops of the electrodes.

However, it is necessary, in order for the oxygen to be recombined at the negative electrodes, to keep the reactive areas of the electrodes damp and also to provide an electrolyte path between positive and negative electrodes. Therefore an absorbant separator material, for example glass wool or nonwoven polyester, is placed between the positive and negative electrodes. This material acts as a wick and, when less than fully saturated, provides both the desirable moist "bridge" between the electrodes and a pore structure which permits a flow of gaseous oxygen from the positive electrodes to the negative electrodes.

Quantitatively the second mechanism described above provides a far higher rate of oxygen recombination than does the first. Both mechanisms, however, are inversely related to the distance between the electrodes.

Unsealed lead-acid storage cells are known to the art in which two thinner-than-normal positive electrode portions have been placed side by side so as to constitute a single, thick positive electrode. In such cells an electrolyte supply extending above the tops of the electrodes has been used, as well as some electrolyte which lies between the two positive electrode portions.

In summary, present teachings fail to describe a sealed lead-acid cell construction in which full use is made of the positive and negative active materials during low-rate discharges, while still maintaining a rate of oxygen recombination sufficiently high so as to preclude any substantial water loss.

SUMMARY OF THE INVENTION

This invention relates to the battery art and, in particular, to sealed lead-acid cells in which oxygen evolved at the positive electrodes during charging is recombined with hydrogen at the negative electrodes and returned, as water, to the electrolyte.

It is a chief object of this invention to devise a sealed lead-acid cell of the class described which exhibits superior performance at low discharge rates.

It is another object of this invention to devise a sealed lead-acid cell of the class described in which sufficient electrolyte is present to fully utilize the active materials of positive and negative electrodes.

It has been found that the foregoing objectives may be realized by providing, within the cell, positive electrode means comprising one or more positive electrode assemblies. Each positive electrode assembly, in turn, comprises a first positive electrode member lying adjacent and in spaced-apart relation to a first negative electrode, and a second positive electrode member, electrically connected in parallel with the first positive electrode member, lying adjacent and in spaced-apart relation to a second negative electrode. The said first and second positive electrode members define a space lying therebetween which may be filled with a foraminous material body and which will constitute a reservoir for electrolyte. Porous absorbant separators are also included between the positive and negative electrodes. Electrolyte added to the cell will be absorbed by the active materials of the positive and negative electrodes, the separators lying between the electrodes, and the foraminous material body lying in the reservoir space. The total amount of the electrolyte thus absorbed will, provided that the reservoir space is sufficiently large, be sufficient to discharge the positive and negative electrodes. Total volume of the pores in the active materials, separators and foraminous material body of the reservoir is designed to be greater than the total volume of the electrolyte absorbed therein, and thus all of these materials will be less than fully saturated with electrolyte. This, in turn, permits free transport of oxygen from the positive electrodes to the negative electrodes, thereby facilitating recombination at the negative electrodes.

By means of this construction a novel storage cell is provided, having ample electrolyte contained therein to provide full capacity even at low rates of discharge, excellent high discharge rate performance, long life, and complete recombination of oxygen evolved during the charging process. Such a cell may be fully sealed and operated in any position.

DETAILED DESCRIPTION OF THE INVENTION

Figure 1:
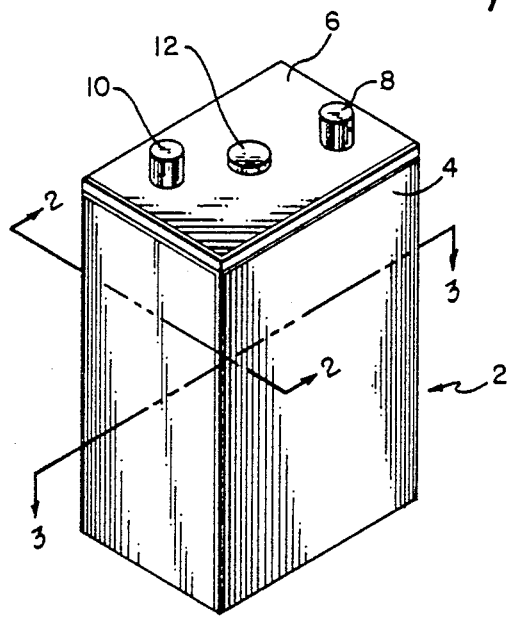
FIG. 1 is a perspective view, illustrating a typical storage cell of the invention.

Refering in detail to the Drawings, FIG. 1 illustrates a typical prismatic sealed lead-acid storage cell of the invention, generally denoted by the arrow 2. The cell arrow 2 includes a jar body 4 and a cover 6, which cover is hermetically sealed in a conventional manner to an upper end of the jar body 4. Extending through cover 6 are positive terminal 8, negative terminal 10 and a one-way valve 12, all of which are sealed to the cover 6 in a conventional manner. This assembly provides a container which is impervious to the passage of gas and electrolyte. One-way valve 12 is provided as a safety feature; should there be a malfunction of the recombination process in the cell the valve will allow release of excess internal gases, thus preventing a catastrophic rupture of the container.

Figure 2:
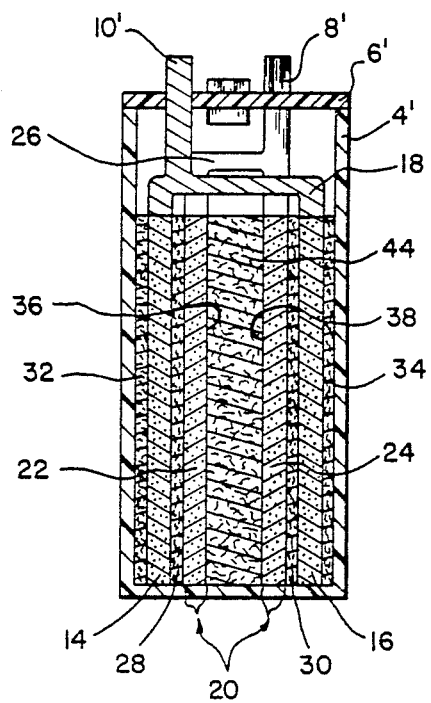
FIG. 2 is a vertical cross-sectional view taken on the line 2—2 of FIG. 1, and illustrating one form of cell in which the positive electrode members are of flat, pasted construction.
Figure 3:
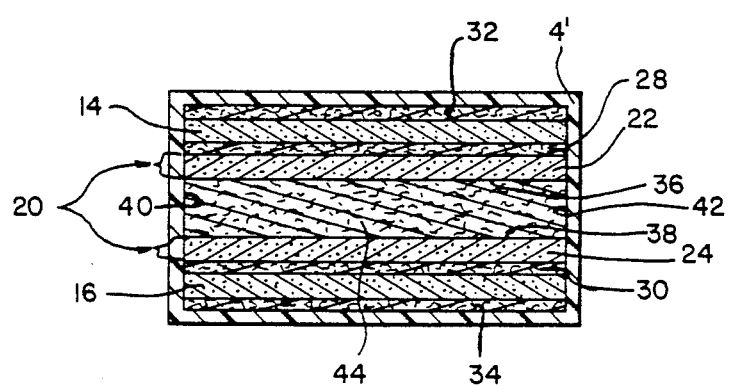
FIG. 3 is a horizontal cross-sectional view taken on the line 3—3 of FIG. 1, also employing flat, pasted positive electrode members.

FIGS. 2 and 3 illustrate, in cross-section, one embodiment of a cell of the invention, having a "three-electrode" construction including flat, pasted positive and negative electrode members. In these figures the jar body is denoted by the numeral 4' and the cover (where shown) by numeral 6'. Numeral 14 denotes a first negative electrode, and numeral 16 a second negative electrode. These electrodes are of conventional, pasted construction, and each comprises a metallic grid structure (usually of a lead alloy) supporting a porous or "sponge" lead active material. The two negative electrodes are identical and are electrically connected together in parallel by means of a lead alloy bridge 18, from which a negative terminal 10' extends upwardly through cover 6'.

A positive electrode assembly, generally denoted by the arrow 20, comprises identical first and second porous positive electrode members 22 and 24, respectively, lying in spaced apart relationship and electrically connected in parallel by lead alloy bridge 26, from which a positive terminal 8' extends upwardly through cover 6'. Positive electrode members 22 and 24 are also of conventional, pasted construction, comprising a metallic grid structure supporting an active material of lead peroxide.

It is pointed out that bridge members 18 and 26 may, if desired, be located outside the container (above the cover 6'). This is usually not done in practice, since it necessitates sealing four terminals to cover 6' rather than the two illustrated.

Lying between first negative electrode 14 and first positive electrode member 22 is porous separator 28. A second, identical porous separator 30 lies between second negative electrode 16 and second positive electrode member 24. If desired, additional porous separators 32 and 34 may be located outside negative electrodes 14 and 16 as shown.

An electrolyte reservoir space is defined by inner surfaces 36 and 38 of first and second positive electrode members 22 and 24, respectively, and by inner surfaces 40 and 42 of jar body 4' (FIG. 3). This space will be filled with a foraminous material body 44 as shown. The material of this body may be similar, or even identical, to the material of the separators.

There are a number of materials which may be suitable for use as separators and as foraminous material for the reservoir. Any material used must be both porous and absorbant, be inert in the storage cell environment, and must not contain harmful impurities. Although synthetic materials such as non-woven polyester may be suitable, a preferred material is a form of glass fiber felt. This material, available commercially, is commonly known as "100% Glass Fiber Separator" material. Resembling common medicinal cotton in appearance, it is about 95% porous and will wet with and wick sulfuric acid electrolyte.

Foraminous material body 44 performs two functions in a cell of the invention. Firstly, it will absorb and retain electrolyte between the positive electrode member 22 and 24, even if the cell should be tipped upon its side or inverted. Secondly, capillary forces associated with separators 28 and 30 which permit formation of desirable moist, but not saturated, gas passages between positive electrode member 22 and negative electrode 14 and between positive electrode member 24 and negative electrode 16 will be balanced by similar forces in foraminous material body 44. By this means electrolyte will be provided with equal access to both sides of positive electrode members 22 and 24.

A sulfuric acid electrolyte body (not shown) is also included within the cell. This electrolyte body will be completely absorbed in the porous structure of the electrodes 14, 16 and 20, the foraminous material body 44, separators 28 and 30 (and separators 32 and 34, if used). The combined volumes of the pores of the positive electrode members 22 and 24, the pores of the negative electrodes 14 and 16, the pores of the separators 28 and 30 (and 32 and 34, if used), along with the pore volume of foraminous material body 44 filling the electrolyte reservoir will be somewhat less than fully saturated. The degree of saturation and the volume of electrolyte will vary with cell design and with the porosity of the various absorbent components listed above. The volume of the electrolyte body may range from 80% to 98% of the available pore volume; a preferred range is 90% to 95%. Gravitational forces will tend to cause lower portions of these components to be fully saturated, while capillary attraction and wicking action will draw electrolyte into upper portions of these components, thus providing the moist acidic environment required for recombination and still maintaining free gas passages between the positive and negative electrodes.

Figure 4:
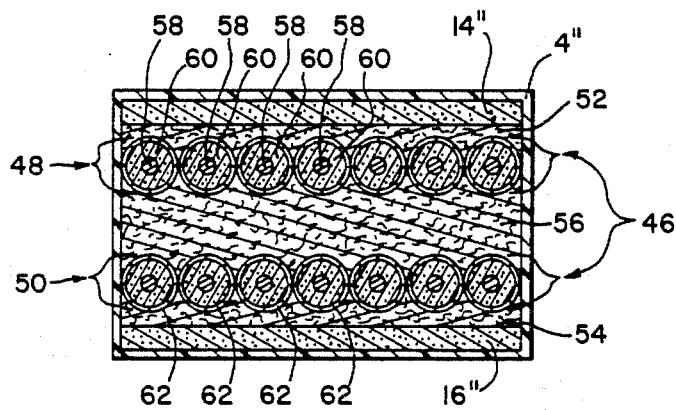
FIG. 4 is a horizontal cross-sectional view, similar to FIG. 3, of another form of cell of the invention, wherein the positive electrode members are of tubular construction.

FIG. 4 illustrates, in horizontal cross-section, a second embodiment of cell of the invention, in which a positive electrode assembly arrow 46 comprises two positive electrode members 48 and 50 which are of tubular construction. A tubular electrode, as is well known in the battery art, includes a lead alloy grid structure comprising a top bar from which depend a series of vertical rods or "spines" as 58. Each spine is surrounded by a cylinder of lead peroxide active material as 60 which, in turn, are surrounded by non-reactive perforated or porous tubes as 62.

Several of the components of the cell illustrated in FIG. 4 may be substantially identical to those of the cell illustrated in FIGS. 2 and 3; these are denoted by numerals having a doubled prime and include jar body 4" and negative electrodes 14" and 16". These components correspond to components 4', 14 and 16, respectively, of FIG. 3. Optional outer separators 32 and 34 (FIG. 3) are not shown in this embodiment. Separators 52 and 54 (FIG. 4) correspond in function to separators 28 and 30 of the earlier figure, but have a somewhat different shape. Similarly, foraminous material body 56 corresponds to material 44, albeit with a different shape. The materials utilized in separators 52, 54 and foraminous material body 56 may be the same as those of 28, 30 and 44, respectively, but are preferably of a pliant, expansive nature such that they will expand to fill in the grooves and other open spaces which may be left by the several tubes as 62 of the positive electrode members. By this means macroscopic voids in which gas bubbles might lodge may be avoided.

In order to more fully describe the invention two examples are hereby presented, illustrating the calculations required to produce a cell having characteristics desired for a particular application.

In normal storage battery designs the height and width of both the electrodes and the electrolyte space is uniform, and therefore the thickness of the electrolyte space and the thickness of the positive electrode are sufficient to define the ratio between the volumes of the electrolyte "layers" and the electrodes. For purposes of simplification further references to electrode and electrolyte volumes will be in terms of the thickness measurement except where otherwise noted.

EXAMPLE 1

A battery, comprising a plurality of cells electrically connected in series, is wanted as an adjunct to a protective alarm system. Requirements for each cell include:
(1) Extended periods of charging at a relatively low "float" rate
(2) High rate discharges may occur at any time (alarm condition)
(3) Long discharges at a low rate may also occur at any time (during a power outage condition)
(4) Must be capable of operating with a charger which may be of poor quality and which may provide uneven charging rates with both high current "peaks" and low current "troughs"
(5) Sealed, "maintenance-free."

A battery for such an application must have a long life under conditions of extended overcharge, implying a need for thick, heavy positive electrodes. It should also have a low internal resistance for the high rate discharges, implying a need for very thin separators between positive and negative electrodes. Thin separators will also be required to obtain good oxygen recombination during the charging process. The cells should include a maximum of active materials and electrolyte in order to obtain a maximum duration of discharge during a power outage condition. It is desired to use a flat plate cell construction similar to that of FIGS. 2 and 3, without the optional outer separators 32 and 34. Components are referenced using the numeral designations of FIGS. 2 and 3.

A positive electrode assembly (20) for this application is selected, comprising two positive electrode members (22 and 24) each 4 mm thick, for a total thickness of 8 mm. Separators 28 and 30 should be as thin as possible; for this application 0.5 mm may be an optimum thickness. Thus, using the 3:1 ratio of "electrolyte layer thickness to positive electrode thickness" described in the Background to this application:
Total electrolyte layer thickness = 3 × (positive electrode thickness) = 3 × 8 mm = 24 mm.
Separator thickness = 2 × 0.5 = 1 mm.
Required thickness of electrolyte reservoir = (required electrolyte layer thickness) − (separator thickness) = 24 mm − 1 mm = 23 mm.

An allowance must now be made for the displacement of electrolyte caused by separators 28 and 30 and the foraminous material body 44 in the electrolyte reservoir. If a material having a 95% porosity is used, the reservoir volume (and thus its thickness) must be increased by 5%. An allowance must be made for incomplete saturation of these materials as well; a preferred degree of saturation is selected as 90%. Thus, for both corrections taken together, the thickness of the foraminous material body 44 (and thus of the reservoir) should be multiplied by a factor of 1.15:

1.15 × 23 mm = 26.5 mm.

EXAMPLE 2

A battery comprising two or more cells electrically connected together in series configuration is desired to be used to power a miner's cap lamp. Requirements for each cell include:
(1) A steady discharge lasting up to 12 hours, repeated on a daily basis.
(2) Charging is carefully and precisely controlled, but must be completed in 10 hours.
(3) Sealed, "maintenance-free," operable in any attitude or position.

In order to provide a long cycle life it is desired to employ a tubular electrode cell construction similar to that shown in FIG. 4. Component parts will be referenced using the numeral designations of FIG. 4.

A standard size for tubes as 62, which enclose active material cylinders as 60 having a diameter of 7.8 mm, has been selected for use in the positive electrode members 48 and 50. An equivalent flat plate, containing an equivalent amount of positive active material, would be approximately 5 mm thick. Thus:
Total electrolyte layer thickness = 3 × (5 + 5) mm = 30 mm.
Separator thickness = 2 × 2.5 mm = 5 mm.
Required (uncorrected) thickness of electrolyte reservoir = (30 − 5) mm = 25 mm.
Corrected reservoir (foraminous material body) thickness = 1.15 × 25 mm = 28.8 mm.

These two examples have been presented to demonstrate principles of this invention. Refinements in the calculations, to optimize the cells, will be obvious to those well-versed in the art. It is also pointed out that modifications and variations of the basic invention may be made therein without departing from the spirit or scope of the invention.

It is also pointed out that, although the preceding two examples describe cells of a "three-electrode" construction, the principles of the invention apply equally to cells containing more electrodes. One such cell is depicted, in horizontal cross-section, in FIG. 5.

In this Figure numeral 64 denotes the wall of a jar member similar to jar member 4 of FIG. 2. Negative electrodes 66A, 66B and 66C, which are electrically connected in parallel with one another, are interleaved with "internal" separators as 68 and positive electrode assemblies as arrows 70. "Outer" separators (corresponding to 32 and 34 of FIG. 3) may also be included, but are not shown in FIG. 5. Positive electrode assemblies as 70 are also electrically connected in parallel with one another.

Each positive electrode assembly as 70 comprises two positive electrode members as 72. In the particular embodiment of FIG. 5 these members as 72 are of flat, pasted construction; it is pointed out that these members may also be of tubular construction. The two electrode members as 72, of each positive electrode assembly as 70, are also electrically connected in parallel with one another.

Foraminous material bodies as 74 lie between adjacent positive electrode members as 72 to constitute electrolyte reservoirs. In general, calculations for such cells may be made as follows:
for n positive electrode assemblies:
number of negative electrodes = n + 1
number of positive electrode members = 2n
number of optional outside separators = 2 number of "internal" separators (exclusive of outside separators) = 2n
number of foraminous material bodies = n
for positive electrode members having a thickness X:
Total required electrolyte layer thickness = 3(2nX) = 6nX
for "internal" separator thickness W and optimal "outer" separator thickness a:
Total separator thickness = 2(a+nW)
(note that, if "outer" separators are not used, a=0.)
Reservoir thickness = 6nX − 2(a+nW)
Corrected reservoir thickness (total thickness of foraminous material body) = 1.15 × [6nX − 2(a+nW)].
Note that there will be n foraminous material bodies in the cell as well, since each positive electrode assembly encloses one foraminous material body. Thus:

$$\frac{1.15 \times [6nX - 2(a + nW)]}{n}$$

Figure 5:
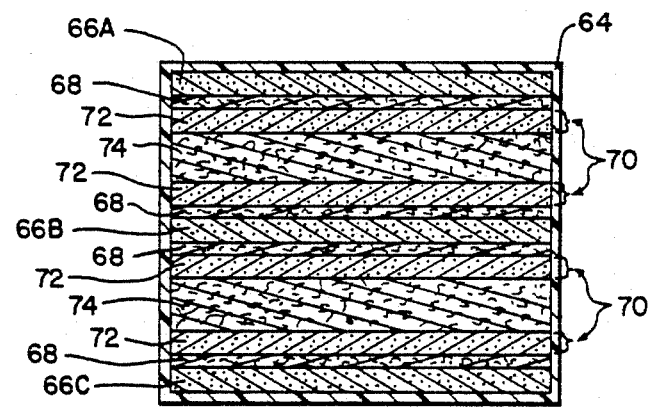
FIG. 5 is a horizontal cross-sectional view, similar to FIG. 3, but illustrating a cell in which are included a plurality of positive electrode assemblies comprising flat, pasted plate members.
Figure 6:
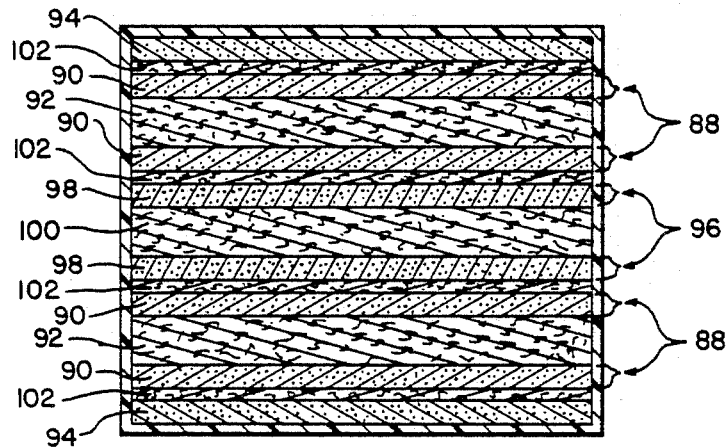
FIG. 6 is a horizontal cross-sectional view, similar to FIG. 5, but illustrating a cell in which is also included a negative electrode assembly comprising two negative electrode members.

A further embodiment of the cell of the invention is shown in FIG. 6. This Figure illustrates a "five electrode" cell, including two positive electrode assemblies as 88, corresponding to positive electrode assemblies as 70 of FIG. 5. Each positive electrode assembly as 88 comprises two positive electrode members as 90, corresponding to positive electrode members as 72 of FIG. 5. Included within each positive electrode assembly as 88 is an electrolyte reservoir space; these spaces may be filled with foraminous material bodies as 92 (corresponding to bodies as 74 in FIG. 5).

Two conventional negative electrodes as 94 are also included in the cell; these correspond to negative electrodes 66A and 66C of FIG. 5. A third negative electrode, corresponding in function to negative electrode 66B of FIG. 5, comprises in the embodiment of FIG. 6 a negative electrode assembly 96. This, in turn, comprises two negative electrode members as 98, lying in spaced apart relationship and electrically connected in parallel to one another. Negative electrode members as 98 define a third electrolyte reservoir space lying therebetween; this space may be filled with a foraminous material body 100 as shown.

The embodiment of FIG. 6 is advantageous in those cases where the separators lying between the positive and negative electrodes (denoted as 68 in FIG. 5 and as 102 in FIG. 6) are too thin to absorb a quantity of electrolyte sufficient to discharge the negative electrodes. In such cases, the electrolyte reservoir within the negative electrode assembly will provide additional electrolyte to the negative electrodes.

As previously disclosed in connection with FIG. 4, it is also possible to employ the principles of this invention in battery cells employing tubular positive electrodes. FIGS. 7-13, inclusive, illustrate examples of such cells and electrodes intended for use in such cells.

Figure 7:
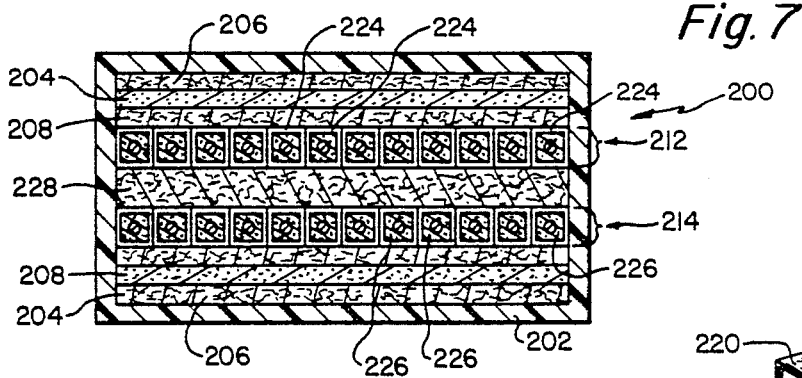
FIG. 7 is a horizontal cross-sectional view, similar to FIG. 4, wherein the tubes of the positive electrode members have a square cross-sectional shape.
Figure 8:
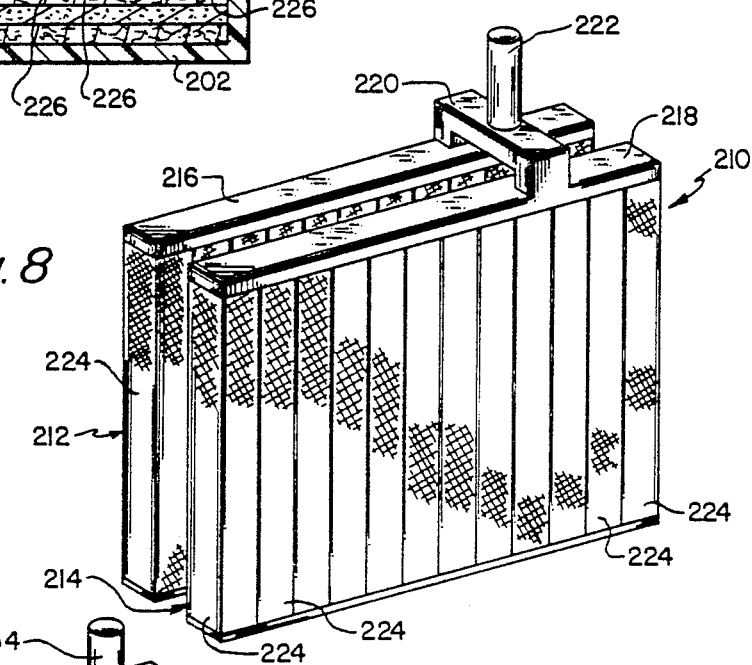
FIG. 8 is a perspective view of a positive electrode assembly of the cell of FIG. 7, comprising two separate and distinct positive electrode members.

FIG. 7 illustrates, in horizontal cross-section, one such cell, denoted by the arrow 200. Included within a jar body 202 are two pasted negative electrodes as 204, optional "outside" separators as 206, and "internal" separators as 208. These parts correspond in nature and function to jar body 4', negative electrodes 14 and 16, "outside" separators 32 and 34, and "internal" separators 28 and 30 of FIG. 3. A positive electrode assembly, shown in more detail in FIG. 8 wherein it is denoted by the arrow 210, comprises two positive electrode members arrows 212 and 214. Top bars of these two positive electrode members, denoted 216 and 218 respectively, are joined together by a lead alloy bridge member 220, from which extends upwardly a positive terminal 222. Located between the positive electrode members 216 and 218 is a foraminous material body 228, as shown in FIG. 7.

Positive electrode members 212 and 214 (FIGS. 7 and 8) differ from positive electrode members 48 and 50 (FIG. 4) in that the latter employ round tubes as 62 surrounding cylinders of active material 60, whereas the former employ square tubes as 224, surrounding prismatic bodies of active material as 226. Because the tubes as 224 present flat surfaces to separators as 208 and foraminous material body 228 macroscopic voids, mentioned previously in connection with FIG. 4, may be avoided. It is pointed out that tubes as 224 may be rectangular rather than square, with a similar effect taking place.

Figure 9:
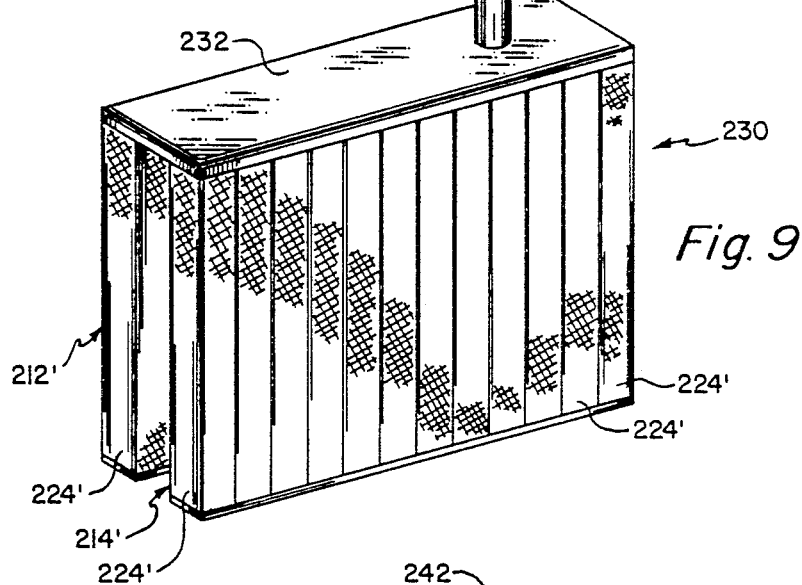
FIG. 9 is a perspective view, similar to FIG. 8, illustrating a positive electrode assembly wherein two positive electrode sections share a common top bar.

It is also possible to produce a positive electrode assembly comprising a single unit, having a common top bar. Such a device is illustrated in FIG. 9, wherein it is denoted by the arrow 230. In this Figure a plurality of square or rectangular tubes as 224' comprise first and second positive electrode sections arrows 212' and 214', respectively, and the said sections are connected to one another by means of a common top bar 232. A positive terminal 234 extends upwardly from top bar 232. A lateral cross-section through the center of a cell containing such a positive electrode assembly will appear identical to that shown in FIG. 7.

Figure 10:
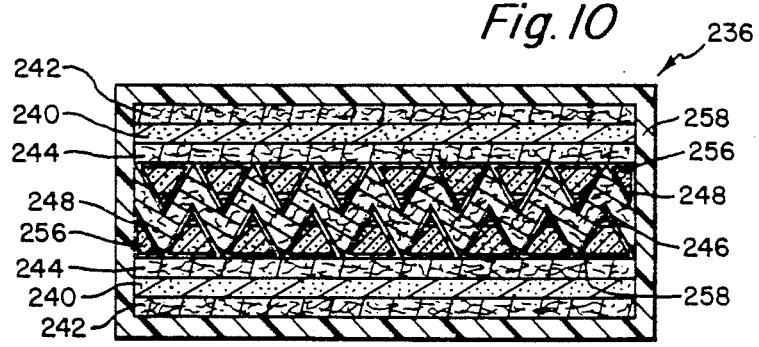
FIG. 10 is a horizontal cross-sectional view of a cell of the invention including a positive electrode assembly of tubular construction, wherein the tubes are triangular in cross-sectional shape.

It is also possible to employ tubes having other shapes, which may provide some advantages in the production process. FIG. 10 illustrates a cell, denoted by the arrow 236, which includes a positive electrode assembly employing tubes whose lateral cross-sectional configurations are substantially triangular. A portion of this cell is shown enlarged in FIG. 11. As in previously disclosed embodiments, cell 236 includes a jar body 238, in which are received two negative electrodes as 240, two optional "outside" separators as 242, and internal separators as 244.

In this embodiment a positive electrode assembly comprises a single positive electrode whose spines, denoted by numerals as 246 and 248, may be substantially triangular in cross-sectional configuration as shown. Spines as 246 and 248 may be located so that they lie substantially within a common plane in alternating arrangement as shown to facilitate casting by conventional means. Substantially triangular tubes as 250 and 252 enclose the spines as 246 and 248, respectively, such that a spine lies at one apex as 251, 255 of each triangular tube, and also enclose porous active material bodies as 254 and 256. Each tube presents an outer side as 253, 257, which is opposite apexes as 251, 255 and which lies in parallel relationship to the plane of the spines. The triangular configuration selected for tubes as 250 (and for spines as 246) is equilateral; the geometry of the cell dictates that end tubes as 252 and end spines as 248 have a 30°-60°-90° triangular configuration. Other triangular configurations are possible as well.

Located between alternating tube members is a foraminous material body 258 which provides the same electrolyte reservoir function as corresponding bodies in previously disclosed embodiments. The triangular configuration of the tubes dictates that foraminous material body 258 be of the pleated shape illustrated.

Figure 11:
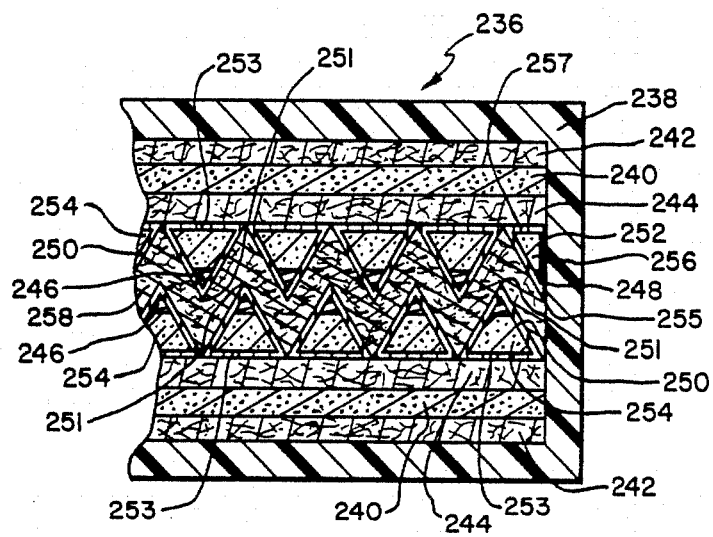
FIG. 11 is an enlargement of a right-hand portion of the cell of FIG. 10.
Figure 12:
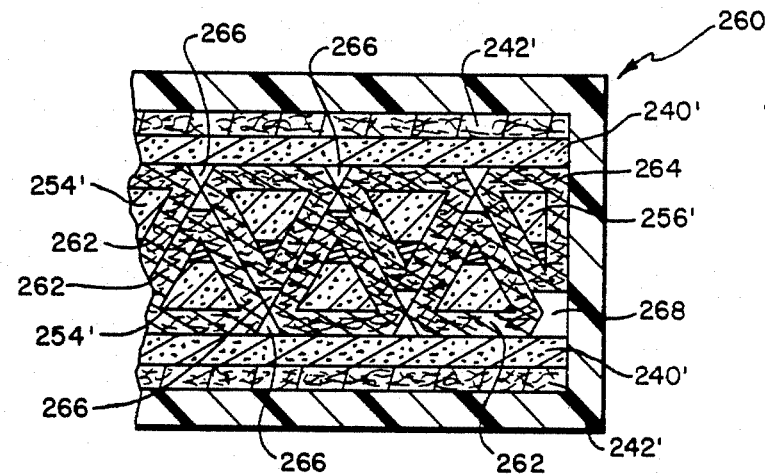
FIG. 12 is a partial horizontal cross-sectional view of a cell of the invention similar to that of FIGS. 10 and 11, but employing thick-walled tubes in lieu of internal separators and foraminous body reservoir.

Proper selection of material for tubes makes it possible to provide thicker walled tubes which also provide the functions of the internal and foraminous material bodies of previously disclosed cells of the invention. One embodiment of cell containing such tubes and corresponding in general to the embodiment of FIG. 11 is illustrated in FIG. 12, wherein it is denoted by the arrow 260. In this Figure optional "outside" separators are denoted by numerals as 242', and negative electrodes by numerals as 240'. Substantially triangular spines of a positive electrode assembly, similar to those disclosed in connection with FIG. 11, are denoted by numerals as 246', 248', and porous positive active material bodies by numerals as 254', 256'. Tubes as 262, 264, which are substantially triangular in cross-sectional shape, surround the said spines and active material bodies in a manner similar to that disclosed in connection with FIGS. 10 and 11. These tubes are fabricated from a pliant, expansible, porous material, for example pressed or compacted glass wool, which may be reinforced with longitudinal fibers if desired. Any impregnants used should be inorganic in nature.

It is pointed out that, in this embodiment as illustrated, macroscopic voids as 266, 268 are present in the cell. When an electrolyte body is added to the cell the tubes as 262, 264 expand to fill in these voids. As an alternative the tubes may be fabricated with thicker wall sections at various points such that the said voids are eliminated, or the voids may be filled with separate, properly-shaped pieces of a foraminous material.

Figure 13:
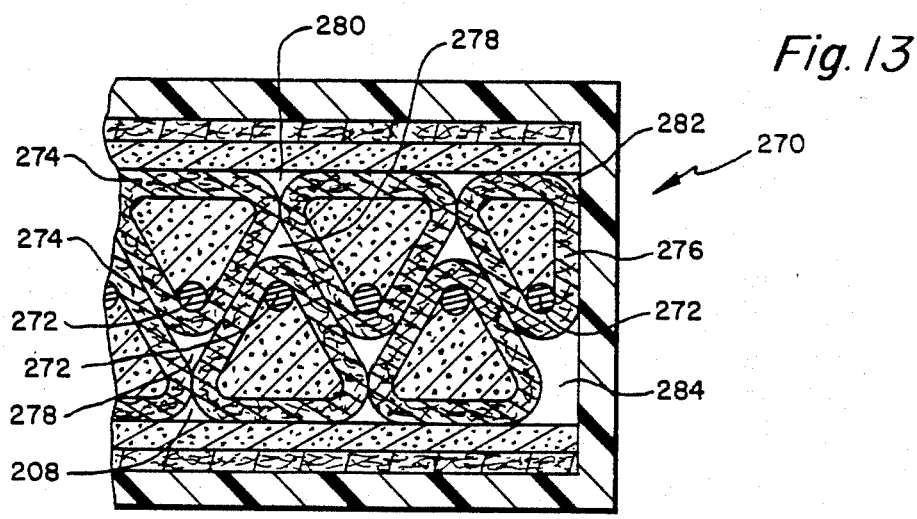
FIG. 13 is a partial horizontal cross-sectional view of a cell of the invention similar to that of FIG. 12, but employing round spines in the positive electrode assembly.

Another, similar, embodiment is illustrated in FIG. 13, wherein a cell of the invention is denoted by the arrow 270. In this embodiment, which is equivalent in other respects to cell 260 of FIG. 12, the positive electrode assembly includes round spines as 272, spaced apart in a conventional manner. Thick walled tubes 274, 276 are substantially triangular in shape and correspond in nature and function to tubes as 262, 264 of FIG. 12. Again macroscopic voids as 278, 280, 282, 284 exist within the cell. These may be filled by any of the techniques disclosed in connection with FIG. 12.

I claim:

1. A sealed lead-acid storage cell, comprising a container impervious to both gas and electrolyte, at least one positive electrode assembly, a plurality of porous negative electrodes arranged in alternating relationship with the positive electrode assemblies, porous absorbant separators located between adjacent surfaces of the negative electrodes and the positive electrode assemblies, and an electrolyte;

characterized in that each positive electrode assembly comprises a first porous positive electrode member and a second porous positive electrode member lying in spaced apart relationship and electrically connected in parallel with one another, each first and second positive electrode member defining a space lying therebetween which comprises an electrolyte reservoir; foraminous material bodies being contained in the said electrolyte reservoirs; the electrolyte being absorbed within the pores of the negative electrodes, the positive electrodes, the separators and the foraminous material bodies; the combined volumes of the pores of the positive electrode members, the negative electrodes, the separators and the foraminous material bodies being greater than the volume of the said electrolyte.

2. The invention of claim 1 in which the thickness of the separators lies within the range from 1/10 to 3.0 mm.

3. The invention of claim 1 in which the thickness of the separators lies within the range from ½ to 2.0 mm.

4. The invention of claim 1 in which the volume of the electrolyte lies within the range from 80% to 98% of the combined volumes of the pores of the positive electrode members, the negative electrodes, the separators and the foraminous material bodies.

5. The invention of claim 1 in which the volume of the electrolyte lies within the range from 90% to 95% of the combined volume of the pores of the positive electrode members, the negative electrodes, the separators and the foraminous material bodies.

6. A lead-acid storage cell comprising an electrolyte and gas impervious container, a plurality of positive electrode assemblies, a plurality of porous negative electrodes, porous absorbant separators lying between the positive and negative electrodes, and an electrolyte, each positive electrode assembly comprising a first porous positive electrode member lying adjacent to at least a portion of a first negative electrode and a second porous positive electrode member lying adjacent to at least a portion of a negative electrode and electrically connected in parallel with the said first positive electrode, each first and second positive electrode member defining a space lying therebetween which comprises an electrolyte reservoir, at least one of the negative electrodes comprising an assembly of two negative electrode members electrically connected in parallel with one another and defining a space lying therebetween which comprises an additional electrolyte reservoir, each electrolyte reservoir containing a foraminous material body, the electrolyte being absorbed within the pores of the positive plate assemblies, the pores of the negative electrodes and negative electrode assemblies, the pores of the separators and the pores of the foraminous material body, the quantity of electrolyte being sufficient to discharge the positive and negative electrodes and the total pore volumes of positive and negative electrodes, the separators and the foraminous material bodies being greater than the volume of the electrolyte.

7. A sealed lead-acid storage cell, comprising a container impervious to both gas and electrolyte, at least one positive electrode assembly, a plurality of porous negative electrodes arranged in alternating relationship with the positive electrode assemblies, porous absorbant separators located between adjacent surfaces of the negative electrodes and the positive electrode assemblies, and an electrolyte;

characterized in that each positive electrode assembly comprises a first porous positive electrode member and a second porous positive electrode member lying in spaced apart relationship and electrically connected in parallel with one another, each first and second positive electrode member defining a space lying therebetween which comprises an electrolyte reservoir; foraminous material bodies being contained in the said electrolyte reservoirs; the electrolyte being absorbed within the pores of the negative electrodes, the positive electrodes, the separators and the foraminous material bodies; the combined volumes of the pores of the positive electrode members, the negative electrodes, the separators and the foraminous material bodies being greater than the volume of the said electrolyte, the said first and second positive electrode members being of tubular construction, each positive electrode member including a grid structure having a top bar and a plurality of spaced-apart spines depending therefrom, a porous positive active material body in intimate contact with each of the said spines, and a porous tube surrounding each of the said spines and positive active material bodies.

8. The invention of claim 7 in which the first and second positive electrode members share a common top bar.

9. The invention of claim 8 in which the spines of each positive electrode assembly lie substantially in one plane, and the porous tubes are substantially triangular in cross-sectional configuration and are arranged such that one spine is located at an apex of each tube and the tubes lie in alternating relationship on either side of the plane of the spines, and the foraminous material bodies are pleated in shape.

10. The invention of claim 9 in which the tubes are fabricated from a thick, porous, pliant and expansible material.

11. A sealed lead-acid storage cell, comprising a container impervious to both gas and electrolyte, at least one positive electrode assembly, a plurality of negative electrodes arranged in alternating relationship with the positive electrode assemblies, and an electrolyte;
characterized in that each positive electrode assembly comprises a grid structure including a top bar, a plurality of spaced-apart spines extending downward therefrom and lying substantially within a common plane and a terminal extending upwardly from the top bar, a substantially triangular porous tube member enclosing each spine such that the said spine lies within an apex of the tube member, the said spine lies within an apex of the tube member, the said tube members being arranged to extend in alternating relationship on either side of the plane of the spines and each tube presenting an outer side which lies in parallel relationship to the plane of the spines, and an active material body received in each of the said tube members in intimate contact with its corresponding spine and with inner walls of the said tube member thereby to completely fill the tube member.

12. The invention of claim 11 in which microporous separator material is located between the said outer sides of the tube members and adjacent negative electrode.

13. The invention of claim 12 in which the tube members are spaced apart from one another and a pleated body of foraminous material is located between adjacent sides of adjacent tubes thereby to provide a reservoir for electrolyte.

14. The invention of claim 10 in which the tube members are fabricated from a thick, pliant, microporous and expansible material thereby to provide a separator between the said active material bodies received in the said tubes and to provide an electrolyte reservoir between adjacent sides of adjacent active material bodies.

15. The invention of claim 14 in which the tubes are fabricated from a felted material.

16. The invention of claim 14 in which the tubes are fabricated from a needle-punched material.

17. The invention of claim 14 in which the tubes are fabricated from a pressed glass wool.

18. The invention of claim 17 in which the tubes are reinforced with longitudinally-oriented fibers.

* * * * *